United States Patent

[11] 3,547,129

| [72] | Inventor | Walter Hirsch |
| | | Don Mills, Ontario, Canada |
| [21] | Appl. No. | 678,161 |
| [22] | Filed | Oct. 23, 1967 |
| [45] | Patented | Dec. 15, 1970 |
| [73] | Assignee | Massey-Ferguson Industries Limited |
| | | Toronto, Ontario, Canada |

[54] ADJUSTABLE CONCAVE
2 Claims, 2 Drawing Figs.
[52] U.S. Cl. ............................................................ 130/27
[51] Int. Cl. ....................................................... A01f 12/24
[50] Field of Search........................................... 130/27.9,
27.95, 27.10, 27.11, 27.16, 27.35; 56/21,
(Condition Responsive)

[56] References Cited
UNITED STATES PATENTS
| 918,285 | 4/1909 | Clark.............................. | 130/27.16 |

FOREIGN PATENTS
| 770,353 | 3/1957 | Great Britain................ | 130/27.16 |
| 234,307 | 6/1961 | Australia....................... | 130/27.11 |

*Primary Examiner*—Antonio Guida
*Attorney*—Gerhardt, Greenlee & Farris

ABSTRACT: An adjustable concave for the threshing assembly of an agricultural combine. A power element which may be in the form of a hydraulic ram is interconnected with the concave through a linkage to apply an external lifting force on the concave to assist the manual adjustment of the concave relative to the cylinder.

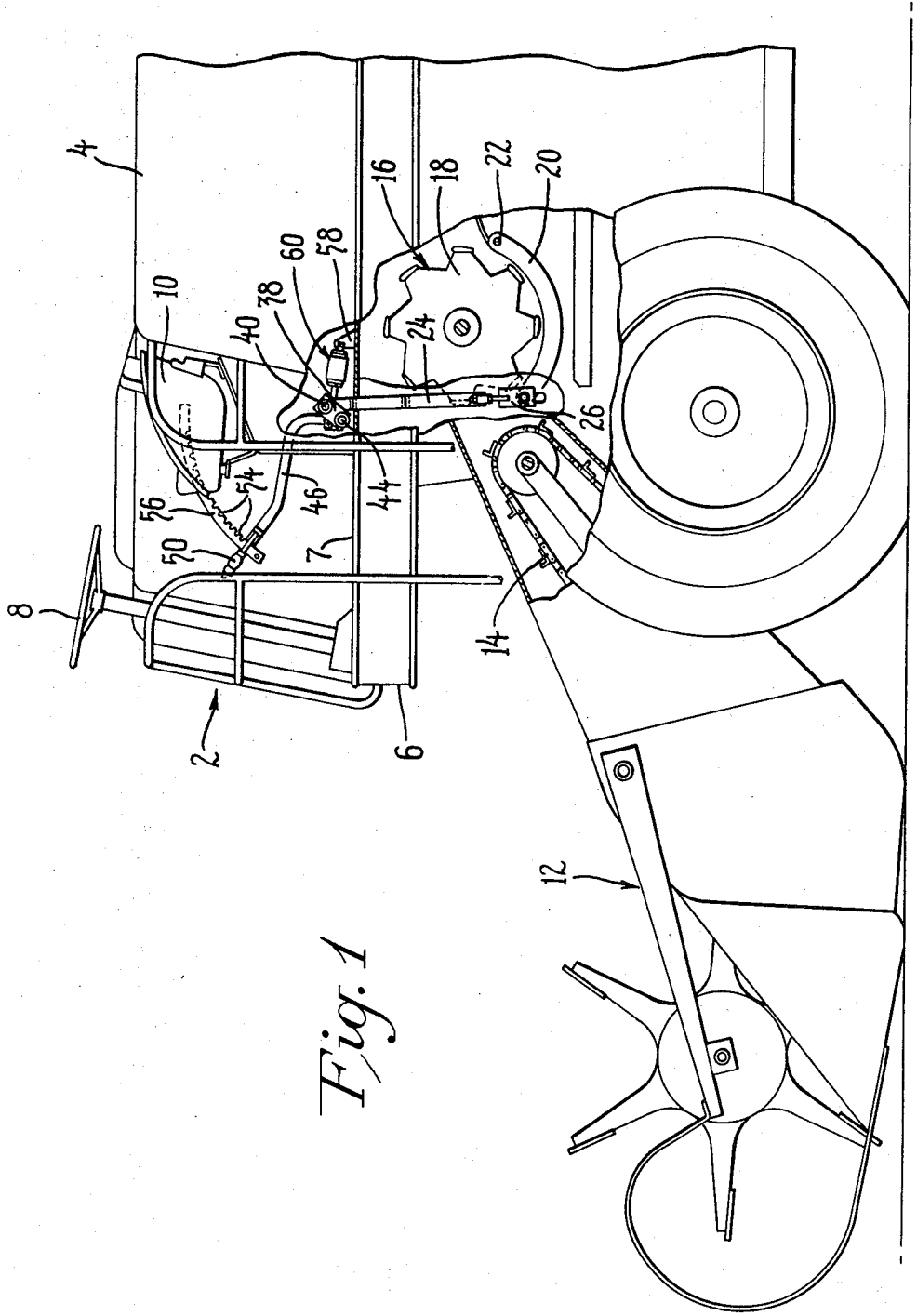

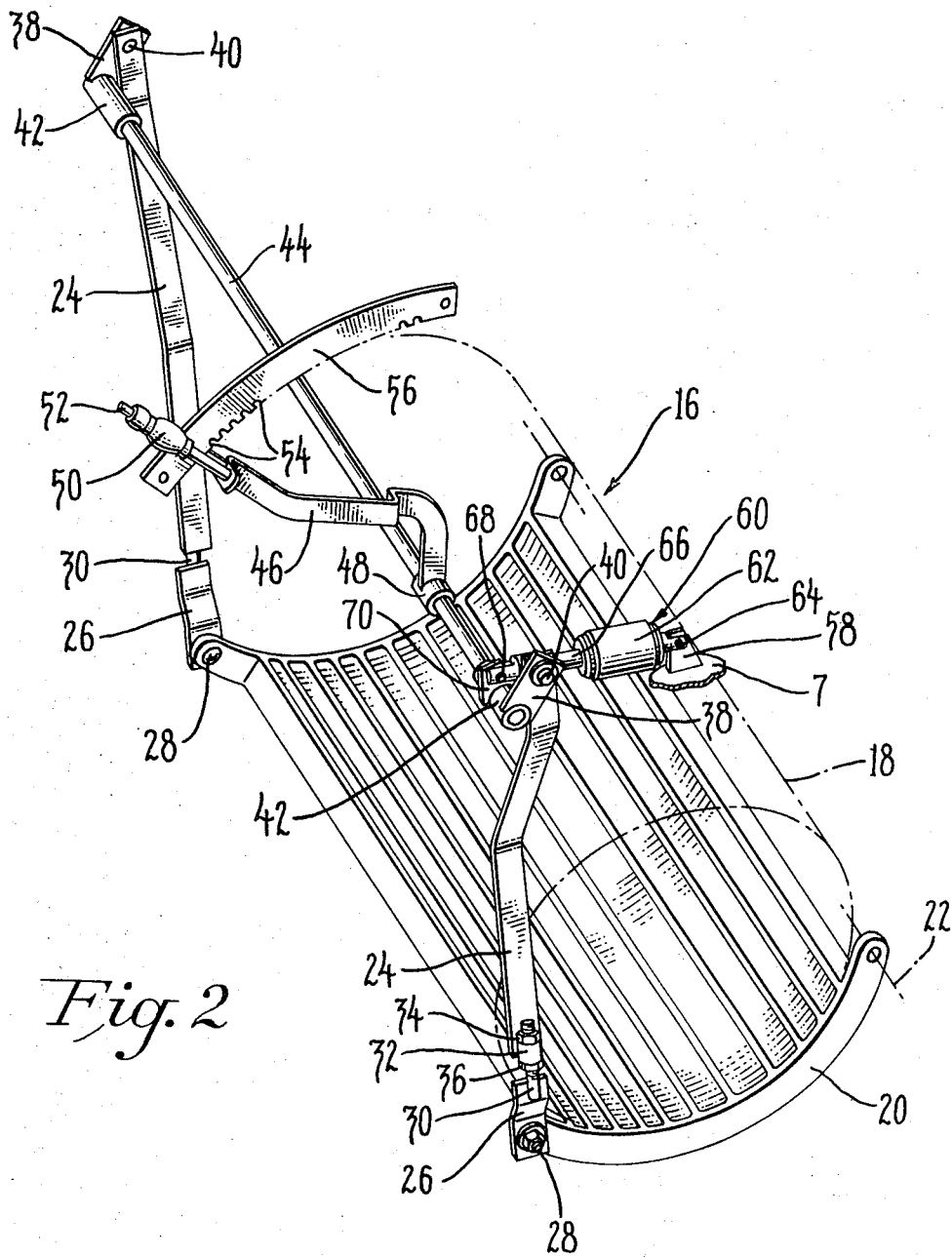

ADJUSTABLE CONCAVE

BACKGROUND OF THE INVENTION

1. Field of the Invention

This invention relates generally to threshing apparatus and is particularly concerned with an arrangement by which a large, heavy concave can be manually adjusted toward and away from its threshing cylinder to accommodate varying crop material and operating conditions.

2. Description of the Prior Art

It is common practice for combines to be employed in various types of crop and to operate under varying conditions necessitating frequent adjustment of the concave relative to the cylinder of the threshing assembly. As the size of combines have increased, the size of the threshing mechanism has correspondingly increased with the result that concaves in the large combines now weigh several hundred pounds. Space limitations and surrounding structure have made it difficult to provide a linkage having adequate mechanical advantage to permit the operator to manually adjust the concave toward and away from the threshing cylinder.

SUMMARY OF THE INVENTION

In accordance with the present invention, the large heavy concave of a combine is interconnected with an external power source through a linkage system. Power is applied to the concave preferably through a hydraulic cylinder which applies a constant control force to the concave and thereby permits the operator to manually adjust the concave toward and away from the threshing cylinder without undue effort.

BRIEF DESCRIPTION OF THE DRAWING

FIG. 1 is an elevational view of a combine with parts broken away to expose the threshing mechanism which embodies the invention; and FIG. 2 is a perspective view of the threshing mechanism shown in FIG. 1.

DESCRIPTION OF THE PREFERRED EMBODIMENT

In FIG. 1, reference numeral 2 collectively designates an agricultural combine having a wheeled main body 4 formed with a horizontal deck 7 extending over an operator's platform 6. The operator's platform supports a steering wheel 8 and seat 10. Projecting forwardly from the main body is a conventional crop harvesting header 12 with a feed elevator 14 for feeding harvested crop material to a threshing assembly 16.

With reference primarily to FIG. 2, the threshing assembly 16 includes a conventional threshing cylinder 18 and a concave 20 which cooperates with the cylinder in a conventional manner to separate grain from harvested crop material. The concave 20 is pivotally mounted at its rear end by a bolt or pin 22 beneath the cylinder and its forward end is supported on the lower portion 26 of an adjustable lift link 24. The lower portion 26 of lift link 24 is pivotally connected by a pin or bolt 28 to the forward end of concave 20 and is secured to the upper portion of the lift link by an adjustment assembly including a rod 30 fixed to the lower portion 26 and threaded at its free end. Rod 30 is received in a sleeve 32 welded or otherwise secured to the upper portion of lift link 24 and is held in adjusted position by nuts 34 and 36 engaged with the threaded end of the rod. The length of the lift link 24 can accordingly be adjusted by changing the positions of nuts 34 and 36 along the length of rod 30.

The upper end of lift link 24 is pivotally connected by a pin 40 to the end of a lever 38 projecting from a sleeve member 42 nonrotatably fixed to a shaft 44 such that rotation of the shaft causes rotation of lever 38 about the axis of shaft 44. Projecting intermediate the ends of shaft 44 is a movable control member in the form of an operating arm 46 which, as shown in FIG. 1, projects through an opening in the wall of the main body so as to be accessible to the operator. Arm 46 is secured to a sleeve 48 nonrotatable mounted on shaft 44. The outer end of operating arm 46 is provided with a handle 50 in which is mounted a conventional locking plunger 52 which is selectively engageable with one of a plurality of notches 54 in a curved locking plate 56 mounted on the sidewall of the operator's station. Movement of the operating member 46 in a clockwise direction, or toward the right as viewed in FIG. 2, causes clockwise rotation of lever 38 about the axis of shaft 44 and counterclockwise movement of concave 20 about its pivot axis at 22. The counterclockwise movement of concave 20 increases the opening between the concave and cylinder. Opposite movement of arm 46 obviously causes a reduction in space between the concave and cylinder by moving concave 20 in a clockwise direction about its pivotal connection at 22.

In present day large combines, concaves frequently weigh over 400 pounds, and the limited space available for the installation of adjustment mechanism makes it extremely difficult to obtain adequate mechanical advantage to permit manual control by the operator without an impractically complex and expensive mechanism. Consequently, in addition to the linkage, an extensible power element in the form of a hydraulic ram 60 is interconnected with the concave through the linkage 24, 38, 44 to permit the operator to adjust the concave with a minimum amount of physical effort. The hydraulic ram 60 is connected with a source of constant pressure and includes a cylinder 62 pivotally connected at 64 with a bracket 58 mounted on the deck 7. The piston 66 of ram 60 is pivotally connected at 68 to an arm 70 nonrotatably fixed to shaft 44 so that arm 70 rotates with shaft 44. A constant pressure is supplied to the hydraulic ram to cause piston 66 to exert a controlling force on arm 70 tending to lift the front end of the concave 20 against its weight.

The weight of the concave 20 tends to retract the hydraulic ram 60 and urge the operating member 46 toward the right as viewed in FIG. 1. However, the cylinder 60 reacts against the weight to prevent too rapid movement of the handle toward the right when plunger 52 is released from one of the notches in plate 56. Thus, in either direction of adjustment, i.e.; either toward or away from the cylinder, the concave is under the complete control of the operator.

While a specific form of the invention has been illustrated, it should be understood that the invention is not limited to the exact construction shown, but that various alterations and modifications in the construction and arrangement of parts is possible without departing from the scope and spirit of the invention.

I claim:

1. A threshing apparatus comprising a rotatable threshing cylinder, a concave, pivotal support means to pivotally support the rear portion of the concave beneath the cylinder and means to pivot the concave about said pivotal support means to adjust the space between the front of the concave and the cylinder including; a shaft rotatably mounted parallel to and spaced from the front of the concave, a pair of levers nonrotatably mounted on the shaft, a first lift link having one end pivotally attached to one side of the concave near the front of the concave and the other end pivotally attached to one of the levers which is nonrotatably mounted on said shaft, a second lift link having one end pivotally attached to a second side of the concave near the front of the concave and the other end pivotally attached to the other lever which is nonrotatably mounted on said shaft, adjustment means to adjust the length of the first and second lift links, means to apply a substantially constant force to the shaft which tends to rotate the shaft to raise the front of the concave, an operating arm which is manually moveable to overcome the weight of the concave and the means to apply a substantially constant force to the shaft, to rotate said shaft to raise or lower the front of the concave, and a locking means to hold the operating arm in a position selected by the operator to give the desired space between the front of the concave and the cylinder.

2. The threshing apparatus of claim 1 wherein the means to apply a substantially constant force to the shaft which tends to rotate the shaft to raise the front of the concave includes an expansible and retractable hydraulic ram connected with a source of constant pressure and pivotally connected at one end to an arm which is nonrotatably mounted on said shaft.